United States Patent [19]
Myers, Jr.

[11] 4,313,798
[45] Feb. 2, 1982

[54] MICRO-WAVE POWERED DISTILLATION UNIT

[75] Inventor: Bert R. Myers, Jr., Oklahoma City, Okla.

[73] Assignee: Lakehurst Galleries, Ltd., Oklahoma City, Okla.

[21] Appl. No.: 160,378

[22] Filed: Jun. 17, 1980

[51] Int. Cl.³ .............................................. B01D 3/02
[52] U.S. Cl. .................................... 202/234; 203/100
[58] Field of Search ....................... D7/128; 203/100; 202/234, 163, 177, 185 R, 185 D, 232, 233, 235, 236

[56] References Cited

U.S. PATENT DOCUMENTS

| 3,440,147 | 4/1969 | Rannenberg | 203/100 |
| 3,577,322 | 5/1971 | Nesbitt et al. | 203/100 |
| 3,700,565 | 10/1972 | Cornish et al. | 202/234 |

*Primary Examiner*—Frank Sever
*Attorney, Agent, or Firm*—Joseph C. Herring and Associates

[57] ABSTRACT

A distiller that includes a micro-wave generating unit in a housing, a water holding chamber for vaporizing water by micro-wave energy and means for conducting water vapor outwardly through the housing while preventing the passage of micro-waves, a condenser for the vapor and a distilled water reservoir. The distiller is automatically operated by sensor operated valves. The heat from the condenser may be used to preheat the feed water.

7 Claims, 5 Drawing Figures

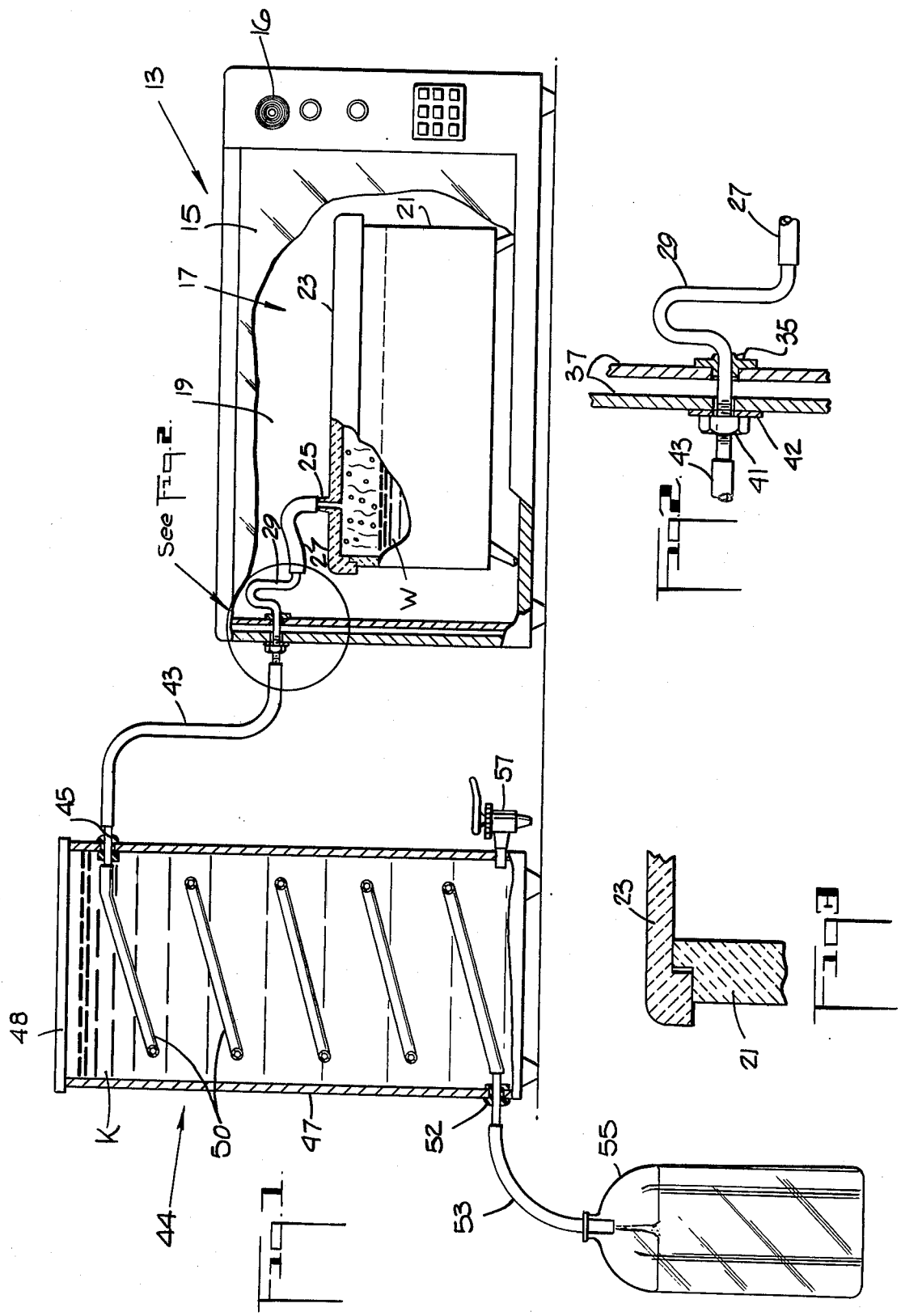

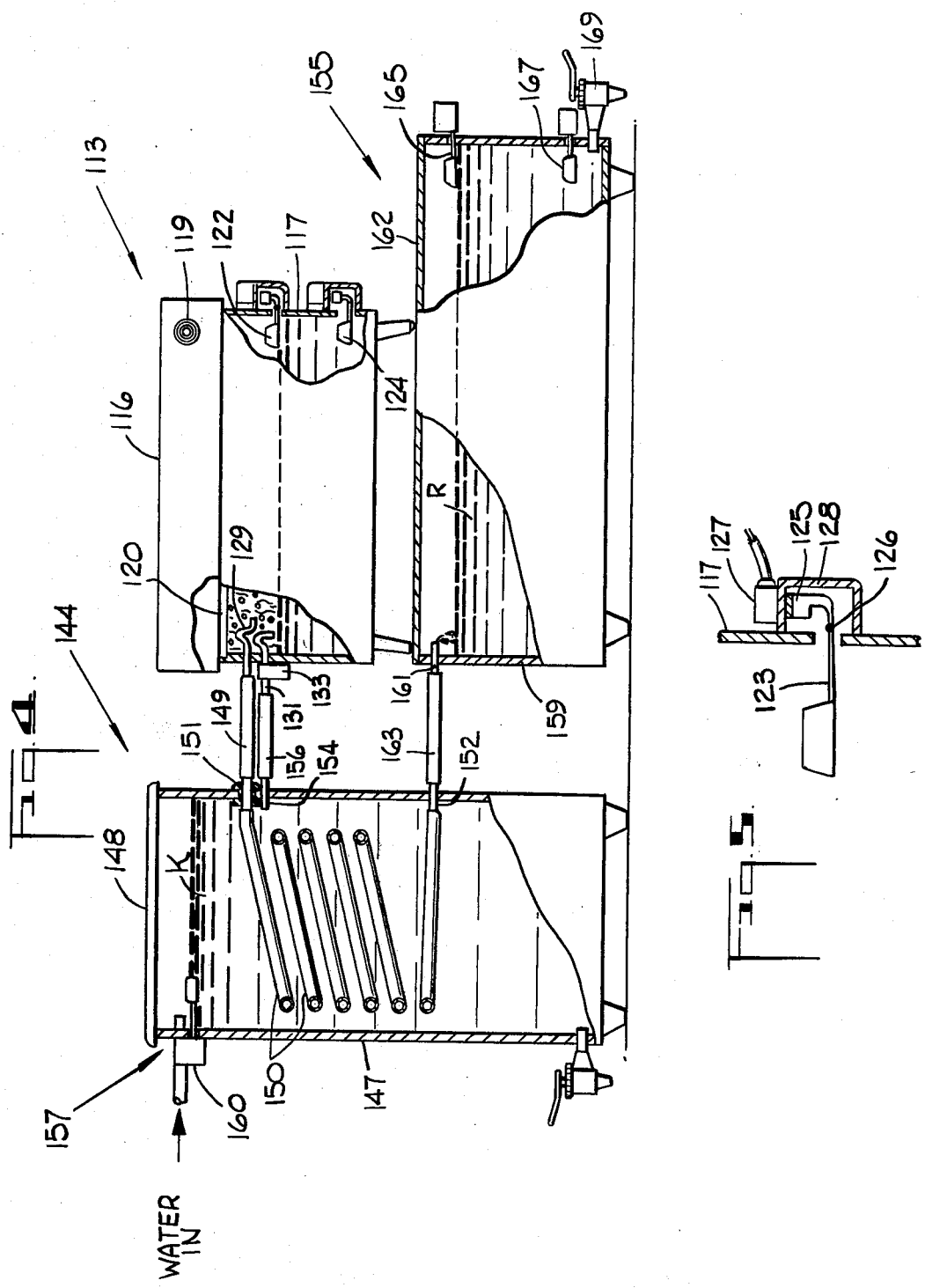

MICRO-WAVE POWERED DISTILLATION UNIT

BACKGROUND OF THE INVENTION

The present invention relates to a distillation apparatus, and more particularly, to a distillation apparatus that utilizes micro-wave energy for vaporizing the fluid to be purified.

In recent years, the consumer has become more aware that tap water in many communities may contain suspected carcinogens, suspended solids and chemicals, as well as bacteria and/or viruses. As a result, a variety of water purification devices and small stills for use in the home have entered the market place.

These devices have been made up of a boiler or container for tap water and a heater for converting the water into steam which is then condensed into a pure product by the cooling action of air or water. The heat has usually been provided by an electrically powered resistance element.

The prior art devices use a lot of energy and take a lot of time to boil the water. In addition, these devices overheat whenever the boiler is empty.

An object of the invention is to provide a distillation apparatus that utilizes micro-wave energy as the power source for vaporizing a fluid.

Another object of this invention is to provide a distiller in which the vaporizing action is relatively quick, economical and free from overheating.

A further object of this invention is to provide for the easy adaptation of conventional micro-wave cooking units for use in a distillation apparatus.

A still further object of this invention is to provide a distiller that is easily assembled and disassembled for quick cleaning and maintenance.

A still further object of the invention is to provide a micro-wave powered water distiller that connects to the water mains and has an automatic mode of operation.

Another object is to use micro-waves to provide distilled water as part of a refrigeration unit so as to provide cold or cool water.

BRIEF SUMMARY OF THE INVENTION

Accordingly, the present invention is a distiller that includes a micro-wave heater having a chamber for holding a fluid to be vaporized. There is a vapor line to conduct the vapor from the chamber to the exterior of the unit. The vapor line is adapted to prevent the passage of harmful micro-waves outside the cooking unit. A condenser is shown adjacent the micro-wave heater unit and has a vapor line disposed with the cooling fluid in heat exchange relationship. This vapor line communicates with the means for conducting vapor from the chamber and exits at a lower point in the condenser-preheater. The cooling fluid is preheated while acting as a coolant and delivered to the distiller. Distilled water produced by condensation of the vapor in the condensing unit is collected in a reservoir.

In one embodiment of the invention there is a boiler insertable within the cooking chamber of a micro-wave oven for use in the home. The boiler is constructed of a heat-resistant material that is substantially transparent to micro-wave energy. In another embodiment of the invention, a raw water container is integral with the cooking chamber, and a fully automatic distilling operation is provided. The reservoir is provided with means responsive to a low level of distilled water for turning on the micro-wave unit, and responsive to a full reservoir to turn off the unit. A conduit connects the condenser to the boiler for gravity flow and there is means responsive to the level of raw water in the boiler to control this inflow. The condensing vessel has an inlet connected to the mains with associated controls for maintaining a desired level of cooling fluid. In a further embodiment there is included refrigeration means for chilling the distilled water.

BRIEF DESCRIPTION OF THE DRAWINGS

FIG. 1 is a partial sectional view in elevation of the invention, with parts broken away to show the boiler construction.

FIG. 2 is an enlarged, fragmentary sectional view of the vapor guide of the invention.

FIG. 3 is a fragmentary enlarged sectional view showing the interface of vaporizer lid and vessel proper.

FIG. 4 is a partial sectional view in elevation of a modified water distiller according to the invention.

FIG. 5 is a fragmentary sectional view illustrating the water level sensor of the boiler shown in FIG. 4.

DETAILED DESCRIPTION OF THE DRAWINGS

FIG. 1 discloses a micro-wave cooker 13 having a pivotally mounted door 15 which is openable to admit a boiler vessel 17 within the cooking compartment 19. The boiler 17 comprises a container 21 and top 23. Outlet nipple 25 depends from top 23 and provides a vapor passage out of the boiler 17. Boiler 17 is constructed of a material such as Pyrex glass which is heat resistant and transparent to micro-waves. Lid 23 engages the top of container 21 to form a vapor impervious fit. Nipple 25 is designed to engage the inside of an end portion of a flexible connector 27 which is preferably constructed of a heat resistant micro-wave transparent material such as Teflon plastic to form a fit which is reasonably secure and allows manual connect and disconnect. Alternately, air chuck, etc. type fittings can be used.

The second end of connector tube 27 is manually fitted over a first-end of a transfer tube 29 best shown in FIG. 2. A second end portion of transfer tube 29 has a flange 35 and is threaded and is fixably secured thrugh cooker walls 37, using nut 41 and washer 42. In the alternative, tube 29 may be soldered or braised to the innermost and outermost surfaces of walls 37. Tube 29 is preferably constructed of stainless steel, or other suitable material that reflects micro-wave energy, and is shaped to act as a micro-wave barrier. The transverse sectional configuration of the transfer tube 29 is shaped so that it will not act as a wave guide to the micro-wave energy which in most cases has a frequency of 2300 to 2600 megacycles. A flexible connector tube 43, which is preferably insulated, has one end which slip fits over the external portion of transfer tube 29 and a second end which is fitted over condenser inlet pipe 45 as shown in FIG. 1. Quick disconnect fittings may be used here, as elsewhere.

Referring to FIG. 1, the condensing unit 44 is constructed of a housing 47 and a vented cap 48 which is removably mounted thereon. The housing 47 is of cylindrical hollow construction and will contain a body of cooling tap water K. The condensing coil 50 has an upper end that connects with inlet tube 45 and runs in a helical pattern to connect at its lower end with the internal portion of outlet tube 52 mounted to the lower portion of housing 47. Flexible outlet tube 53 fits over the exterior end of outlet pipe 52 and communicates with reservoir 55. Spigot valve 57 is mounted in the lower end of housing 47 to permit emptying of the contents of housing 47.

FIG. 4 shows a modification of the invention for fully automatic production of distilled water, and comprises micro-wave unit cooker 113, condenser unit 144 and reservoir 155. The unit cooker 113 includes a power unit housed at 116 mounted by suitable means (not shown) over a boiler 117 for containing raw water to be vaporized. Power unit housing 116 contains the magnetron and associated micro-wave generating equipment of a conventional nature (not shown) for irradiating the contents of boiler 117. A barrier plate 120 of a suitable heat resistant, micro-wave transparent material, such as Pyrex, forms the upper boundary of boiler 117, is removably mounted for access to the boiler and forms a vapor barrier to prevent passage of water vapor to the power unit housing 117. Vapor transfer tube 129 is mounted through the walls of the boiler 117 and is of a similar construction to tube 29. Float activitated water level sensors 122 and 124 can be mounted through the walls of boiler 117 as shown in FIG. 5. The foat 123 which is constructed of a suitable micro-wave transparent plastic with the exception of magnetic tip 125, is pivotally mounted at 126 for movement of magnetic tip 125 in and out of magnetic activation of magnetically sensitive micro-switch 127. The float housing 128 is made of a suitable micro-wave reflective material. Also mounted through the wall of boiler vessel 117 is inlet tube 131, water flow there-through being controlled by a solenoid valve 133.

As shown in FIG. 4, adjacent micro-wave unit 113 is condenser unit 144 constructed of cylindrical housing 147 and a cap 148 removably mounted on the housing 147. Helical condensing coil 150 disposed within vessel 147 has an upper end which terminates at inlet tube 151 which in turn communicates with the transfer tube 129 via flexible connector 149. The lower end of condenser coil 150 terminates at the outlet pipe 152. Mounted through an uppermost portion of the condenser housing 147 is water inlet 157 which is connected with the water mains and has attached float activated valve 160 for controlling inflow of water to the condenser vessel 147. At a pre-determined level below the water inlet 157 is outlet tube 154 which communicates with the boiler water inlet tube 131 by way of flexible tube 156. A solenoid valve 133 is attached to inlet tube 131 and controls water inflow to boiler 117.

Disposed below unit 113 and adjacent condenser unit 144 is pure water reservoir 155 having a housing 159, a vented top 162 and a reservoir inlet tube 161 mounted through an uppermost portion of housing 159, which inlet tube 161 communicates with condenser outlet pipe 152 via flexible connector tube 163. Mounted at a predetermined upper level of the reservoir housing 159 is water level sensor 165. At a pre-determined lower level is mounted a second water level sensor 167. At an even lower level is mounted the spigot valve 169. Water level sensor 165 and sensor 167, of a conventional float design, are connected via relay switches and associated electrical conduit not shown, to a relay switch not shown, for controlling power to micro-wave unit 113. Boiler water level sensors 122 and 124 are in electrical communication with solenoid valve 133.

In the operation of the apparatus of the invention as depicted in FIG. 1, top 23 of boiler 17 is removed to permit vessel 17 to be filled with tap water W. Boiler 17 is placed within cooking compartment 19 and connecter tube 27 is manually secured over outlet nipple 25 and door 15 is then closed. The condensing unit 44 is filled with cool tap water K. Control 16 is then set to turn on micro-wave power for a pre-determined time interval which corresponds to the time necessary to vaporize the quantity of water in boiler 17. Micro-wave energy passes through the walls of boiler 17 to be absorbed by the water W which has its temperature quickly raised to the point of boiling. The resultant vapor is directed through nipple 25, connector tube 27, and away from cooker 13 via the transfer tube 29. The vapor or steam is then conducted via connector tube 43 to the inlet 45 of the condenser unit 44. Heat flows from the vapor through condensing coils 50 to the cooling water K and the vapor condenses on the interior of coils 50. The condensed steam in the form of distilled water then exits the condenser at 52 and collects in a suitable storage vessel 55.

The cooker timing is set to insure that the boiler does not run out of water.

In the automatic operation of the apparatus of the invention shown in FIG. 4, power switch 119 is first turned on and if the reservoir water level sensor 165 indicates the reservoir 155 is not filled, micro-waves will irradiate the raw water mass W, raising its temperature to boiling. The resultant water vapor or steam is then directed out of unit 113 via the transfer tube 129 through tube 149 and into the condenser unit 144 at inlet tube 151. The cooling action of water mass K produces a pure water condensate which leaves the condenser unit 144 via outlet pipe 152 and is delivered into reservoir 155 via connector tube 162 and inlet 161.

When the level of raw water W within vessel 117 falls below the level of sensor 124, solenoid valve 133 is energized and opened to permit a flow of water from condenser 144 to vessel 117 under force of gravity due to the pressure differential indicated by the higher level of condenser cooling water. The water thusly injected into boiler 117 is in effect pre-heated water due to the heat gain from the condenser cooling coils 150. This enhances operational efficiency. When the water level within the vessel 117 is raised to the level of the sensor 122 solenoid valve 133 is de-energized to stop the inflow of water. Whenever the level of cooling water K in condenser unit 144 falls below full, the float valve 160 trips to permit an inflow of water from the water mains until the water level returns to full.

It will be noted in the apparatus shown that the system does not operate under vacuum or pressure and the condenser vessel, boiler vessel, and pure water reservoir are vented. Furthermore, the flow between containers is basically a gravity flow eliminating the need for pumps.

It is apparent, within the scope of the invention, modifications and different arrangements may be made other than herein disclosed, and the present disclosure is illustrative merely, the invention comprehending all variations thereof.

What is claimed is:

1. A distillation system utilizing a conventional, kitchen-type micro-wave oven to supply energy for distillation of fluids comprising:

(a) a conventional, kitchen-type micro-wave oven;

(b) a boiler means dimensioned and designed to fit within the micro-wave oven;

(c) tubular prevention means adapted and dimensioned to pass through a wall of the micro-wave oven, and adapted for quick connection to and disconnection from a connection means to the boiler means and a connection means to the condensing means and dimensioned and designed for preventing the passage of micro-wave energy to the exterior of the micro-wave unit while conducting vapors from the boiler means to the condensing means;

(d) condensing means having a connection means adapted for quick connection to and disconnection from the prevention means, a heat exchange relationship with a cooling means, and a condensed fluid outlet.

2. The sytem of claim 1 including a fluid storage means adapted to receive condensed fluid.

3. The system according to claim 2 including a refrigeration means in energy flow communication with said storage means.

4. The system of claim 1 wherein the boiler means is removably disposed within the cooking chamber and further comprises a vessel having walls of heat resistant, substantially micro-wave transparent material.

5. The system of claim 1 wherein the prevention means further comprises a metallic micro-wave barrier of generally tubular construction which is fixedly mounted through the wall of the micro-wave oven by metallic micro-wave barrier fastening means so as to form a micro-wave barrier between the inner and outer portions of the micro-wave oven.

6. The prevention means of claim 5 wherein the conduit describes a path through the wall of the oven which is generally perpendicular to a surface of the wall and has a portion adjacent to the interior surface of the wall describing at least two turns of at least 90° and designed and dimensioned to prevent the transmission of micro-waves through the prevention means.

7. The system of claim 1 wherein the boiler is provided with means, responsive to a low level of fluid, and adapted to turn on the micro-wave oven and responsive to a high level of fluid to turn off the micro-wave oven.

* * * * *